(12) United States Patent
Schultz et al.

(10) Patent No.: US 7,630,077 B2
(45) Date of Patent: Dec. 8, 2009

(54) SYSTEM AND METHOD FOR IMAGING THROUGH AN IRREGULAR WATER SURFACE

(75) Inventors: Howard Schultz, Amherst, MA (US); Andres Corrada-Emmanuel, Windsor, CT (US)

(73) Assignee: University of Massachusetts, Boston, MA (US)

( * ) Notice: Subject to any disclaimer, the term of this patent is extended or adjusted under 35 U.S.C. 154(b) by 295 days.

(21) Appl. No.: 11/872,413

(22) Filed: Oct. 15, 2007

(65) Prior Publication Data

US 2008/0088842 A1     Apr. 17, 2008

Related U.S. Application Data

(60) Provisional application No. 60/883,284, filed on Jan. 3, 2007, provisional application No. 60/851,487, filed on Oct. 13, 2006.

(51) Int. Cl.
*G01J 4/00* (2006.01)
(52) U.S. Cl. .......................... 356/366; 358/364; 358/370
(58) Field of Classification Search ......... 356/364–370; 250/225
See application file for complete search history.

(56) References Cited

U.S. PATENT DOCUMENTS

| | | | | |
|---|---|---|---|---|
| 3,917,408 | A * | 11/1975 | Stachnik | 356/367 |
| 5,528,493 | A | 6/1996 | Potter | |
| 6,836,285 | B1 * | 12/2004 | Lubard et al. | 348/31 |
| 7,038,776 | B1 * | 5/2006 | Ansley et al. | 356/364 |
| 7,420,675 | B2 * | 9/2008 | Giakos | 356/364 |

OTHER PUBLICATIONS

Martin, Ellie: "Submerged Platforms Improve Stealth and Virtual Periscope Technology", Sep. 2003, www.dt.navy.mil/pao/excerpts%20pages/2003/september/virtual%20periscope.com.
Arete Associates: "The Virtual Periscope", 2005, www.arete.com/index.php?view=virtual_periscope.
Oleg Konstantinov: "Measurements of sea level, wave height and slopes by analysis of sea surface image sequence from polarization camera", 2003.

* cited by examiner

*Primary Examiner*—L. G Lauchman
(74) *Attorney, Agent, or Firm*—O'Shea Getz P.C.

(57) ABSTRACT

An underwater imaging system includes an underwater imaging polarimeter that captures images of the water surface. The captured images are indicative of the captured light, and are equivalent to four-component Stokes vector S=(I,Q,U,V) data. Advantageously, the passive imaging technique of the present invention utilizes polarmetric data. In contrast, conventional optical remote sensing techniques rely on light amplitude and frequency to carry information about the scattering surface. The imaging technique of the present invention exploits these properties, as well as the polarization properties of light to sense information about the scattering media. The two-dimensional slope field of surface wave can be recovered from a distance without interfering with the fluid dynamics of the air or water. By employing the physics of light scattering by a specular surface, the geometry of the surface can be found by measuring the polarimetric properties of the reflected and/or refracted light. The derived two-dimensional slope field in then used to remove the image distortion caused by light passing through the wavy surface. The undistorted images have the appearance of images taken through a flat water surface.

10 Claims, 6 Drawing Sheets

SYSTEM AND METHOD FOR IMAGING THROUGH AN IRREGULAR WATER SURFACE

PRIORITY INFORMATION

This patent application claims priority from U.S. provisional patent application Ser. No. 60/851,487 filed Oct. 13, 2006 and U.S. provisional patent application Ser. No. 60/883,284 filed Jan. 3, 2007, both applications are hereby incorporated by reference.

BACKGROUND OF THE INVENTION

The present invention relates to the field of imaging, and in particular to forming an image of the above surface environment located on or above the surface of the water from underneath the water utilizing an imaging polarimeter to infer the two-dimensional slope of the water surface in the field-of-view of the image pixels.

U.S. Pat. No. 5,528,493 entitled Virtual Periscope discloses the use of an underwater camera, processor, and display system that reconstructs a fragmented image seen from below the surface into a view of the hemisphere atop the ocean surface. Unlike a conventional periscope that collects light from a position above the ocean surface, this U.S. patent discloses collecting skylight penetrating through the ocean surface with one or more upward-looking cameras positioned below the surface. The deeper the sensor, the larger the field of view available on the ocean surface. As the sensor's depth increases, however, it also receives less light. Because the underwater imaging system disclosed in this patent relies on peaked waves to collect rays from near the horizon, it cannot see as far as a conventional periscope extended above the wave tops.

According to Snell's Law, light above the surface is refracted below the surface into a cone of light that can be imaged by an upward-looking underwater camera equipped with a wide angle lens. However, the raw imagery collected by such a camera is unintelligible due to the distorting influence of waves on the ocean surface. The camera field of view must be about 130° to encompass the entire cone of refracted light and reconstruct the entire hemisphere above the surface.

Essential to producing useful through-surface imagery is the ability to map the ocean surface and characterize the perturbation of the light reaching the underwater sensor. Physical concepts of wave dynamics, Snell's Law, Fresnel transmission, and image blurring are key to this ability. Therefore, sophisticated signal processing techniques are required to extract useful information from the distorted imagery, especially for the portion of the scene of greatest interest near the horizon.

Therefore, there is a need for an improved underwater imaging system.

SUMMARY OF THE INVENTION

An underwater imaging system includes an underwater imaging polarimeter that captures images of the water surface. The captured images are indicative of the captured light, and are equivalent to four-component Stokes vector $S=(I,Q,U,V)$ data. The first component I is representative of the intensity of the light. The components Q and U measure the degree of linear polarization, and the fourth component V specifies the degree of circular polarization. This assists in determining the polarization state of light since, in general, a ray will be elliptically polarized which needs to be decomposed into linear and circular polarization components.

Advantageously, the passive imaging technique of the present invention utilizes polarimetric data. In contrast, conventional optical remote sensing techniques rely on light amplitude and frequency to carry information about the scattering surface. The imaging technique of the present invention exploits these properties, as well as the polarization properties of light to sense information about the scattering media. The two-dimensional slope field of a short gravity wave can be recovered from a distance without interfering with the fluid dynamics of the air or water.

By employing the physics of light scattering by a specular surface, the orientation of the surface can be found by measuring the polarimetric properties of the reflected and/or refracted light. As known, the polarization state of a bundle of light rays may be described by the four-component Stokes vector $S=(I,Q,U,V)$. The first component I measures the intensity of the light. The components Q and U measure the degree of linear polarization, and the fourth component V specifies the degree of circular polarization. This last component is crucial to fully determining the polarization state of a light since, in general, a ray will be elliptically polarized which is a combination of linear and a circular polarization components.

The reflection and refraction of light at a specular surface is described by the Mueller calculus, which states the Stokes vectors of the input and scattered rays ($S_{in}$ and $S_{out}$) are related by $S_{out}=MS_{in}$, where M is the Mueller matrix. The direction of the rays, the dielectric properties of the air and water, and the Mueller matrix contain geometric orientation information about the scattering surface (reflection from the air-sea interface and refraction through the air-sea interface). Thus, by measuring the components of $S_{out}$ with a subsurface imaging polarimeter inferring polarization properties of $S_{in}$, the orientation of the surface in each pixel's field-of-view can be computed.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
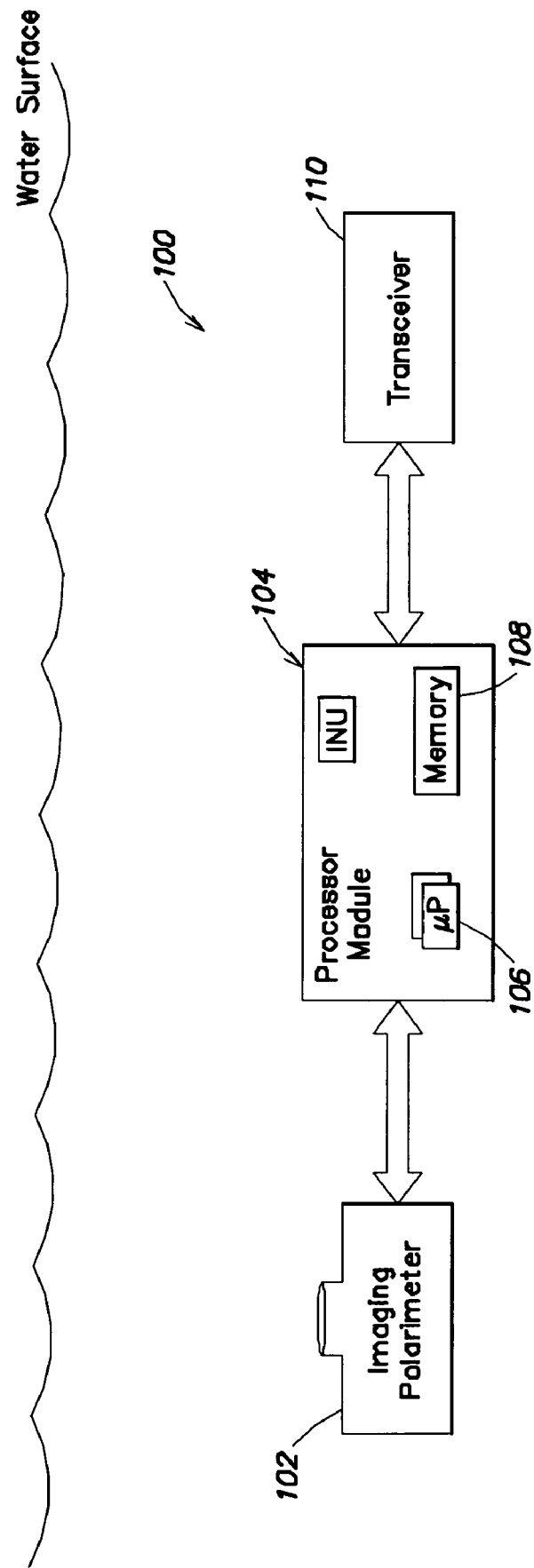
FIG. 1 is a pictorial illustration of an underwater imaging system.

FIG. 1 is a pictorial illustration of an underwater imaging system 100 that includes an imaging polarimeter 102 located beneath the surface of the water. The system also includes a processor module 104 comprising a processor 106 (e.g., one or more DSPs) and memory 108. The system may also include a transceiver 110 that allows the system 100 to communicate with devices above and possibly also underneath the surface of the water. An image storage device may also be included with the system.

The imaging polarimeter system provides four data components, where the four components are equivalent to the I,Q,U,V elements of the Stokes vector. An imaging polarimeter is similar to a three-component R,G,B color camera, except that four components of polarization are measured instead of three components of color. The underwater imaging polarimeter may be characterized by several requirements. First, the underwater imaging polarimeter should have an integration time fast enough to freeze the motion of a short gravity wave riding on ocean swell. Second, the imaging polarimeter should have a frame rate fast enough to capture the temporal structure of short gravity waves riding on ocean swell. Third, the imaging polarimeter should have a dynamic range capable of imaging in non-uniformly illuminated sky conditions.

Advantageously, the system of the present invention infers the surface slope field using an imaging polarimeter located below the surface of the water.

Figure 2:
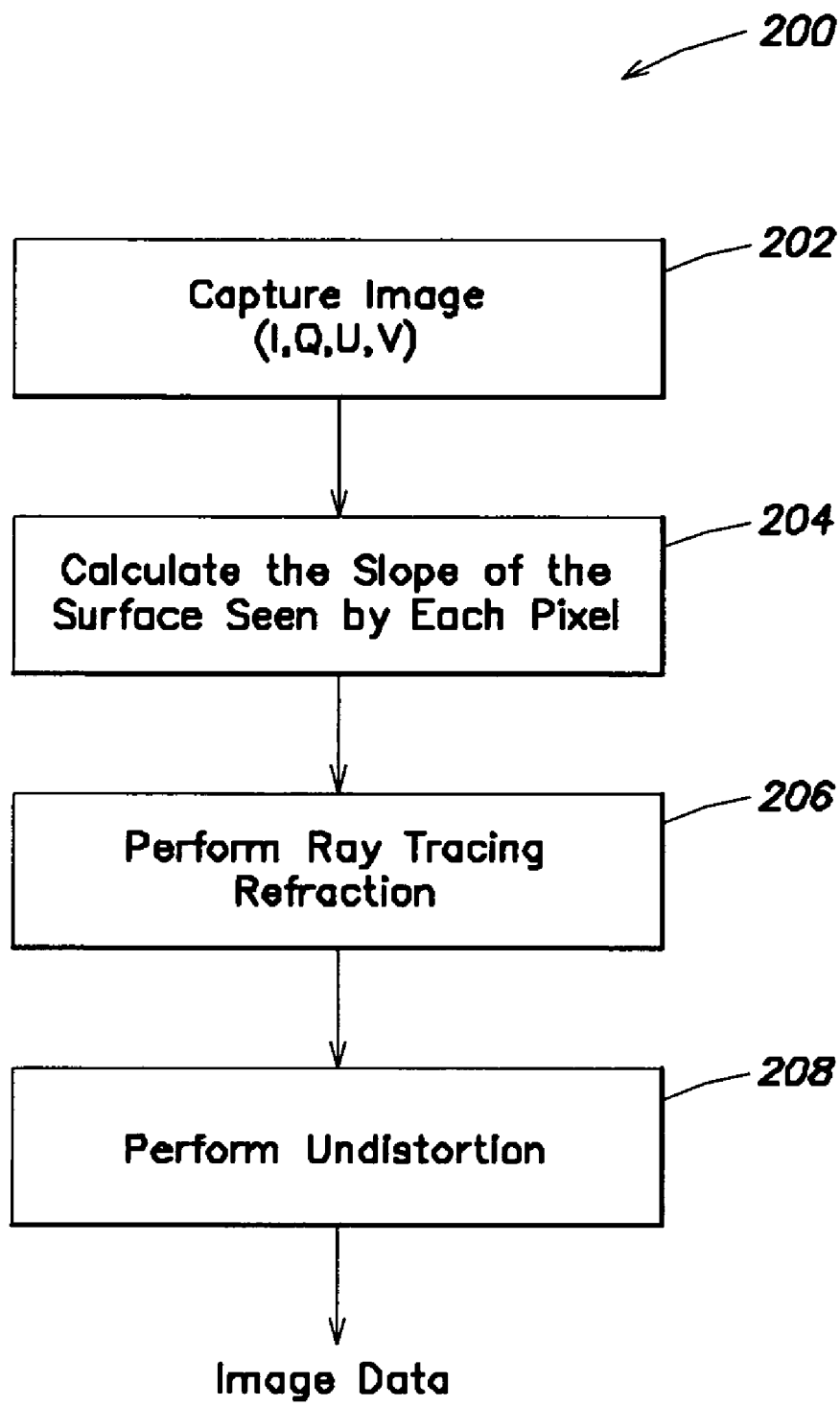
FIG. 2 illustrates a plurality of processing steps performed by the underwater imaging system.

FIG. 2 illustrates processing steps 200 performed by the underwater imaging system 100 (FIG. 1). In step 202 the underwater imaging polarimeter 102 (FIG. 1) captures the refracted light and provides data that is the equivalent of, and may be processed to provide, the I,Q,U,V elements of the Stokes vector. The captured image data is processed by the processor module 104 (FIG. 1) to calculate the slope of the surface seen by each pixel of the imaging polarimeter as shown in step 204. It is contemplated that expressly transforming the captured image data to Stokes vector data may not be necessary, since the processing of the present invention may work on the captured image data. Ray tracing refraction is then performed by the processor module 104 in step 206, followed by undistortion processing in step 208 to provide image data.

In step 202, the submerged, upward looking imaging polarimeter 102 (FIG. 1) takes polarimetric images of the down-welling radiance. The light collected by the imaging polarimeter 102 comes from several sources such as skylight (including the sun) and light scattered in the water column, and under certain conditions, skylight reflecting from surface objects and artificial illumination. During daylight conditions the dominant light source is skylight. Each pixel of information captured by the imaging polarimeter 102 includes four values, which are equivalent to the Stokes parameters, and characterize the polarization state of the bundle of light rays in each pixel's field-of-view. The four-component pixel values are converted to polarization values by a predetermined calibration function, which is associated with the particular imaging polarimeter 102 being used. Furthermore, the direction in space of each pixel's chief ray (i.e., the line drawn through the center of each pixel's field-of-view and the entrance pupil of the sensor) is known from intrinsic and extrinsic orientation parameters. The intrinsic orientation parameters are typically determined by the camera manufacturer and represent parameters indicative of, for example, the focal lens length, the pixel size, the principal point, and the lens distortion model of the imaging polarimeter 102, the size of the imaging sensor (e.g., the CCD) in the camera, et cetera. The intrinsic parameters may be determined in laboratory using known calibration techniques. The extrinsic orientation parameters are specific to each installation and are preferably determined for each instance an image is taken. If the imaging polarimeter 102 is mounted on a moving platform then information indicative of the platform movement includes the speed of the platform, the depth of the platform, et cetera are required to determine the extrinsic orientation of the sensor. This information may be obtained for example from an inertial navigation unit (INU), which may include an inertial measurement unit (IMU) and a GPS receiver. From the polarimetric images and orientation information the system computes a map of the polarized down-welling radiance, which is comprised mainly of skylight refracted through the ocean surface. Several factors including, the scattering and the change in polarization that occurs when light propagates through sea water, motion of the imaging polarimeter, surface obstruction (e.g., foam, debris, et cetera), breaking waves, bubbles, et cetera, must be taken into account in order to provide an accurate image.

Figure 3:
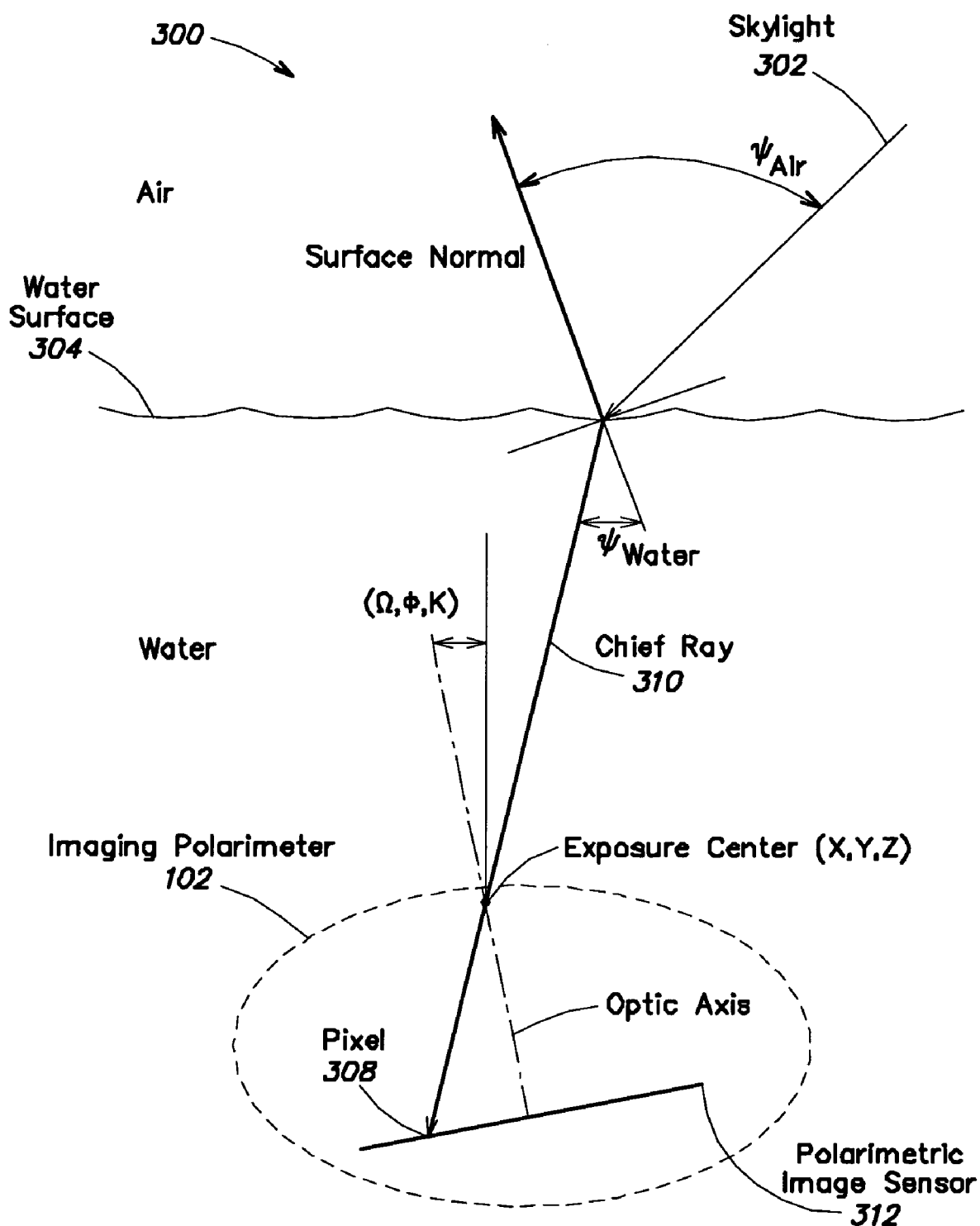
FIG. 3 is a pictorial illustration of the image acquisition step.

FIG. 3 is a pictorial illustration 300 of the image acquisition associated with step 202 (FIG. 2). Down-welling skylight 302 refracts through water surface 304 and is imaged by the imaging polarimeter 102 (FIG. 1). The change in the angle of refraction $\Psi_{AIR}$ to $\Psi_{WATER}$ and the change in the polarization state of the skylight 302 crossing the water surface 304 are related to the index of refraction of the water and the orientation of the surface normal vector. The refracted light rays are imaged at pixel 308 where chief rays 310 intersect polarimetric image sensor 312. An inertial navigation unit (INU) may be used to determine the exterior orientation parameters of the imaging polarimeter 102, specified by the rotation $(\Omega,\Phi,K)$ and translation $(X,Y,Z)$ of the imaging polarimeter system.

In step 204 the two-dimensional surface slope field is determined using the captured image data (e.g., Stokes vector data) for each pixel (e.g., pixel 308 of FIG. 3). When passing from air to water the polarization state of light changes. The change in polarization is a function of the indices of refraction of the two media, and the orientation of the boundary relative to the propagation direction. Using the principle of the conservation of electromagnetic energy across a boundary, the orientation of the air-sea interface may be calculated for each pixel of the polarimetric images by measuring (or estimating) the polarization state and direction of a bundle of light rays on both sides of the air-sea interface. If the sky radiance is unpolarized, the orientation of the boundary can be found from the degree of linear polarization, the polarization orientation, and the direction of the transmitted rays.

To avoid placing an upward-pointing imaging polarimeter above the air-sea boundary in order to determine the polarized ski radiance, an estimate of the polarized sky radiance may be used. These estimates can be made by taking advantage of the natural time scales of the process, and the spatiotemporal distribution of surface slopes. In order of shortest to longest time-scales are the image sensor's integration time $t_i$ (typically less than 100 microseconds); the rate of change of surface slopes caused by wave action $t_w$ (typically in the range of 1 to 100 milliseconds); and the rate of change of sky radiance $t_s$ (typically greater than 1 second). In other words, the shape of the air-sea boundary is frozen with respect to the integration time, and a large number of polarimetric images can be acquired before the polarized sky radiance significantly changes ($t_i<<t_w<<t_s$). In addition, the distribution of surface slopes is approximately normal with a zero mean. The time scale separation and surface slope distribution statistics can be exploited to solve the inverse problem of estimating the polarized sky radiance from a large number of observations from the submerged imaging polarimeter. In general, the estimate of the sky radiance may be obtained by comparing a number of images taken over a period of time (e.g., less than one second), since the sky radiance will generally remain the same during this time period and thus may be estimated.

In step 206, the refraction across the air-sea interface is estimated using the surface slope information from step 204 and the orientation information. After the orientation of the air-sea boundary (represented by a two-dimensional slope map of the water surface) and the direction of the chief rays in the water have been estimated for each pixel, this step applies Snell's law to estimate the direction of the chief rays above the air-sea boundary.

Figure 4:
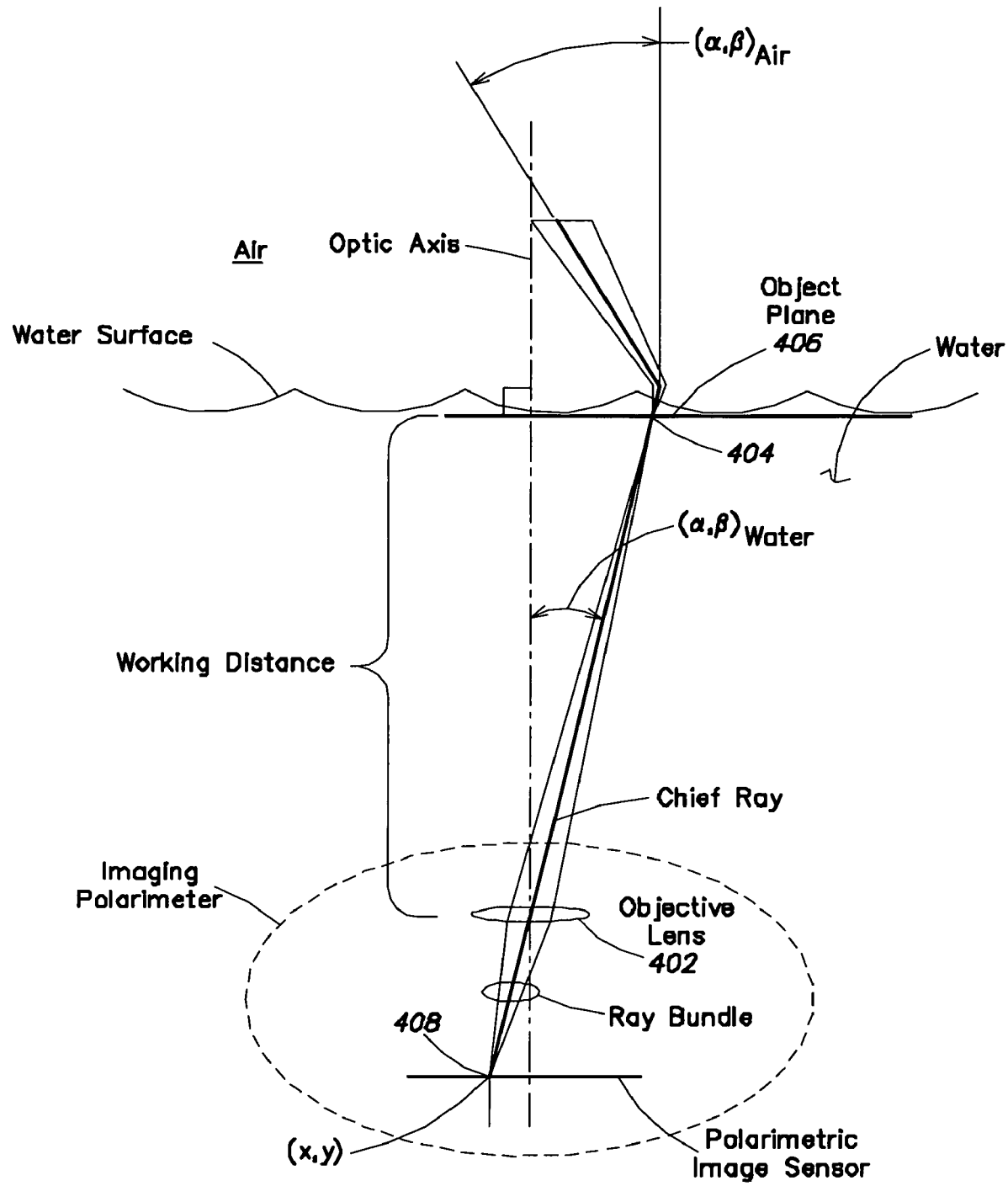
FIG. 4 is a pictorial illustration of a technique for removing image distortion.

In step 208, using the knowledge of the intrinsic and extrinsic orientation parameters of the image sensor, and the orientation of the chief rays (e.g., 310 in FIG. 3) above and below the air-sea boundary 304 (FIG. 3), the distortion caused by a wavy air-sea boundary may be removed. One technique for removing the distortion is illustrated in FIG. 4. Referring to FIG. 4, a lens 402 projects a bundle of light rays passing through a point 404 on an object plane 406 to a point 408 on the image sensor, such that a monotonic function of the incidence angles ($\theta_x$, $\theta_y$) of the chief rays entering the lens aperture is mapped to a monotonic function of the spatial coordinates (x,y) on the image sensor. In other words, increasing (x,y) coordinates on the image correspond to a monotonic function of ($\theta_x$, $\theta_y$) of the chief rays entering the lens aperture. Image distortion is removed by re-mapping the image so that increasing (x, y) coordinates on the image correspond to a monotonic function of ($\theta_x$, $\theta_y$) of the chief rays above the water surface. The re-mapped image has the appearance of an image taken through a flat water surface.

Figure 5:
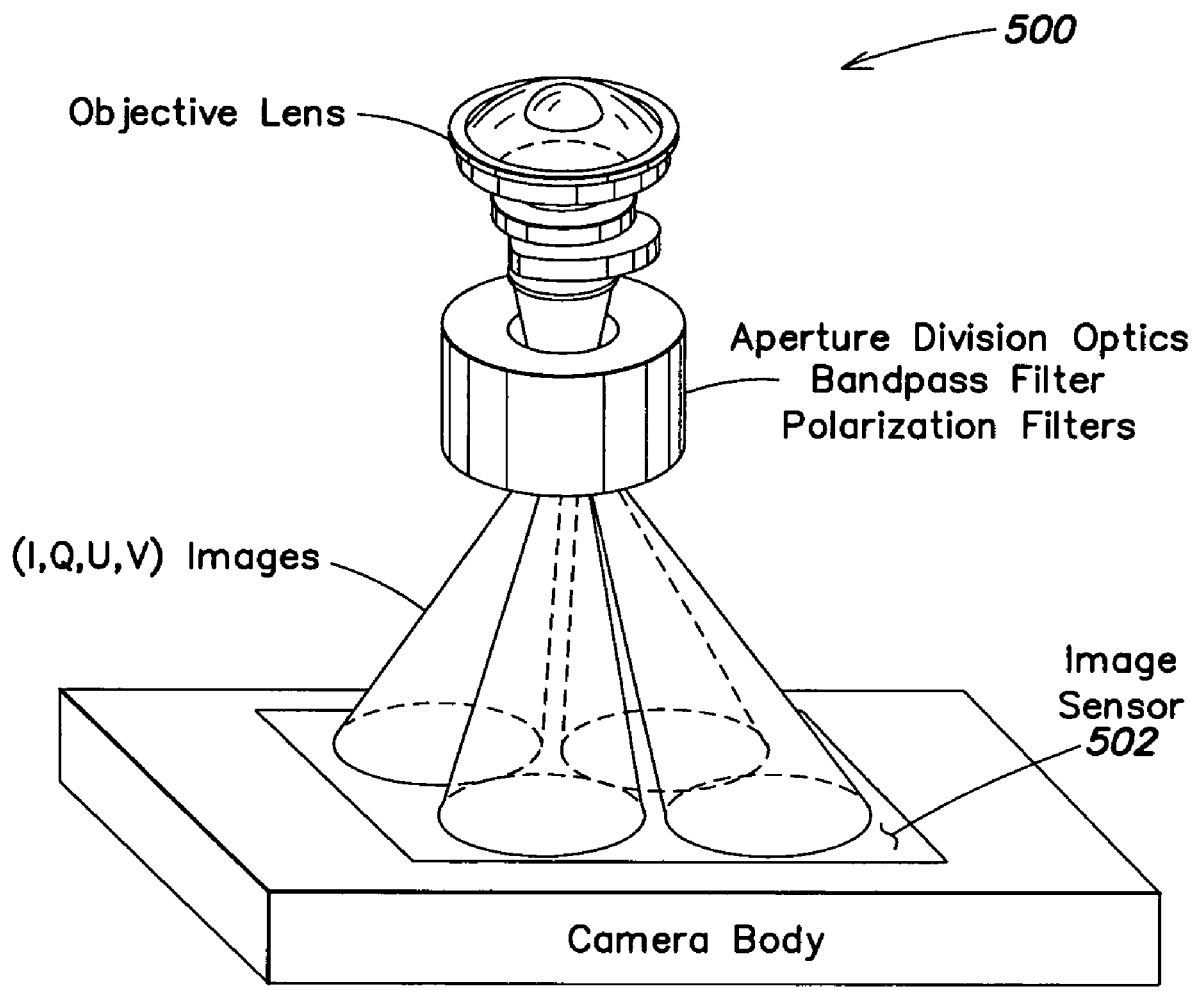
FIG. 5 illustrates a first embodiment of a four-component imaging polarimeter.

FIG. 5 illustrates a four-component polarimetric camera 500. As shown, the aperture projects four identical replicas of the image on to an image sensor 502 using aperture division. Each of the four images is filtered with a combination of linear polarization filters and retarders. The result is four images that may be processed to provide the four components of the Stokes vector.

Figure 6:
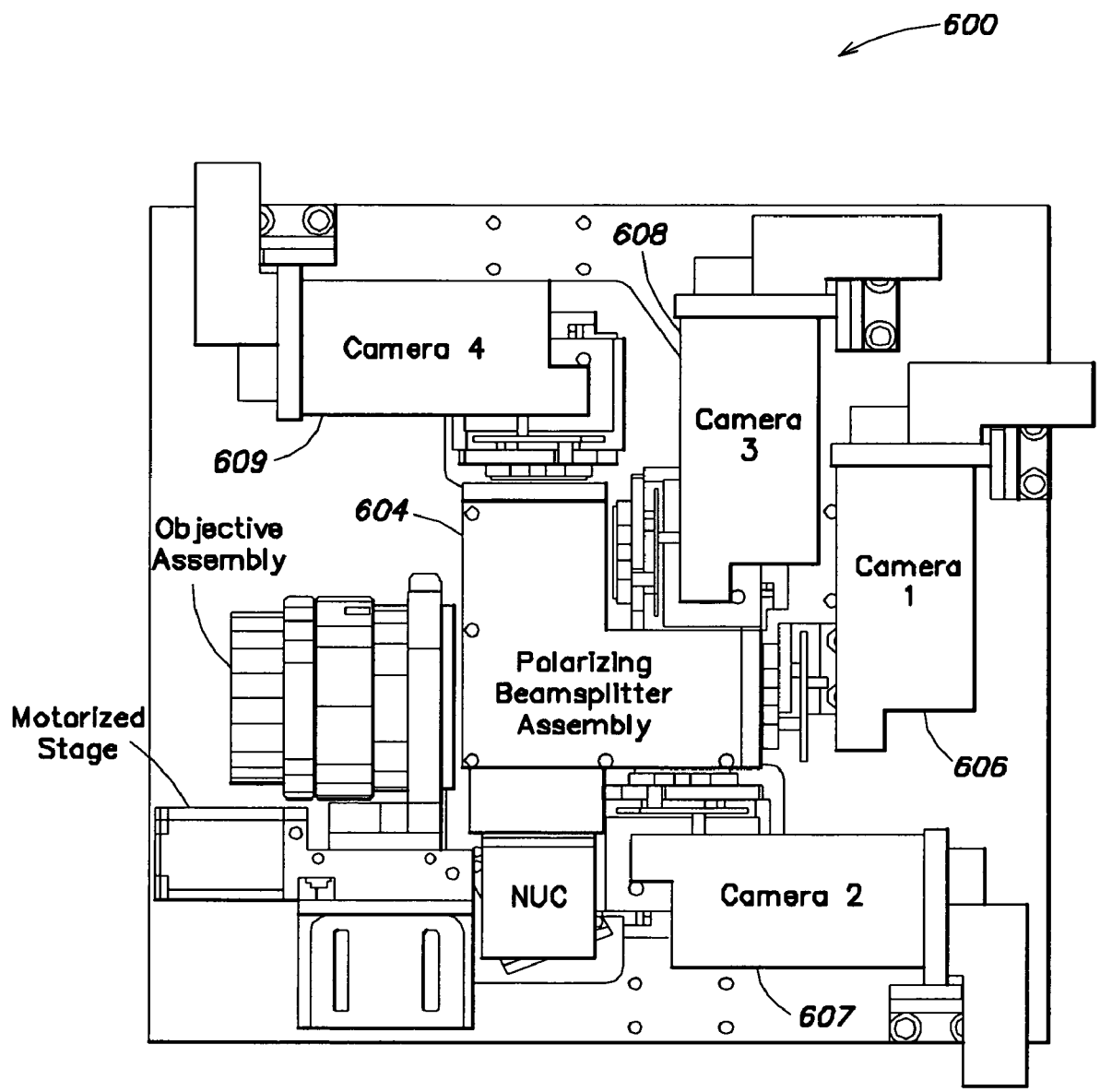
FIG. 6 illustrates a second embodiment of a four-component imaging polarimeter.

FIG. 6 illustrates an alternative embodiment four-component imaging polarimeter 600, which provides four images that may be processed to provide the four components of the Stokes vector. In this embodiment, the imaging polarimeter 600 utilizes a polarizing beamsplitter assembly 604 that provides four different optical paths to four uniquely associated cameras 606-609. Each of the cameras 606-609 provides a detected signal value to the processor module 104 (FIG. 1), which processes the detected signal values to provide the four Stokes vectors. Such an imaging polarimeter is available for example from Polaris Sensor Technologies, Inc. of Huntsville, Ala.

In another aspect of the invention, the imaging polarimeter may be used to track an aerial platform (e.g., airplane or unmanned air vehicle (UAV)), and the imaging polarimeter can be used to significantly improve the optical communications capabilities between the aerial vehicle and the submerged vehicle.

When the surface is smooth it is relatively easy to establish a communication link between the aerial platform and the submerged platform. However, surface waves often make it very difficult, if not impossible, to establish a communication link. The technique of the present invention can be used to correct for the distortion caused by surface waves, which facilitates establishing and maintaining a communications link by removing the distortion caused by surface waves. For example, the underwater imaging system may be used by a communication system to characterize the surface of the water (i.e., channel) to improve for example the signal to noise ratio (SNR) of the received communication signal.

Although the present invention has been shown and described with respect to several preferred embodiments thereof, various changes, omissions and additions to the form and detail thereof, may be made therein, without departing from the spirit and scope of the invention.

What is claimed is:

1. An underwater sensor for forming an image of the above-the-water environment including items located on or above the water surface, the sensor comprising:
   an underwater imaging polarimeter that captures an image of the water surface and provides four-component image data equivalent to Stokes vector data and indicative of light passing through the water surface into the water; and
   a processing unit that receives and processes the four-component image data to generate an image of the environment on or above the water surface.

2. The underwater sensor of claim 1, further comprising:
   a transceiver that receives the image and transmits image data indicative thereof.

3. The underwater sensor of claim 1, where the four-component image data includes an equivalent of a first component (I) indicative of the intensity of light, second and third components (Q, U) indicative of linear polarization, and a fourth component (V) indicative of circular polarization.

4. The underwater sensor of claim 1, where the processing unit process the four-component image data to generate two-dimensional surface slope field data.

5. The underwater sensor of claim 1, further comprising an inertial navigation unit that provides position, attitude and velocity data of the underwater imaging polarimeter that is used by the processing unit to generate the image.

6. The underwater sensor of claim 1, where the underwater imaging polarimeter comprises four image sensors.

7. The underwater sensor of claim 6, where the underwater imaging polarimeter comprises a plurality of beam splitters that provide four different optical paths which are uniquely associated with one of the four image sensors, which each provide data for the four-component image data.

8. An underwater sensor for forming an image of the above-the-water environment including items located on or above the water surface, the sensor comprising:
   an underwater imaging polarimeter that captures an image of the water surface and provides four-component image data indicative of light passing through the water surface into the water, where the underwater imaging polarimeter comprises an objective lens assembly that provides a ray bundle to a polarizing beamsplitter that splits the ray bundle into four different optical paths each uniquely associated with one of four image sensors that provides image data for the four-component image data; and
   a processing unit that receives and processes the four-component image data from the four image sensors to generate two-dimensional water surface slope field data from which an image is generated indicative of the environment above or on the water surface, including objects located on or above the water surface.

9. The underwater sensor of claim 8, further comprising an inertial navigation unit that provides attitude, position and velocity data of the underwater imaging polarimeter that is used by the processing unit to generate the image.

10. The underwater sensor of claim 9, where the underwater imaging polarimeter comprises four image sensors.

* * * * *